March 24, 1953     A. R. WILSON     2,632,619
GUN CARRIER
Filed Aug. 12, 1949
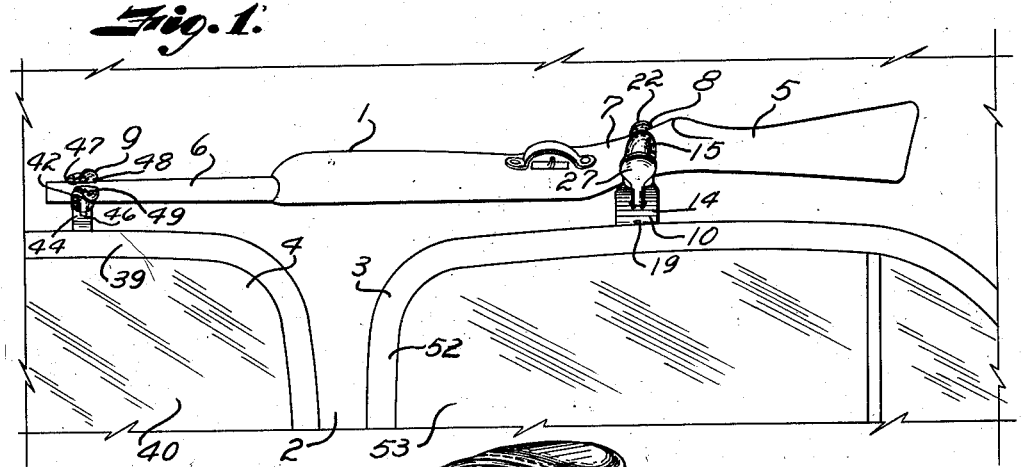
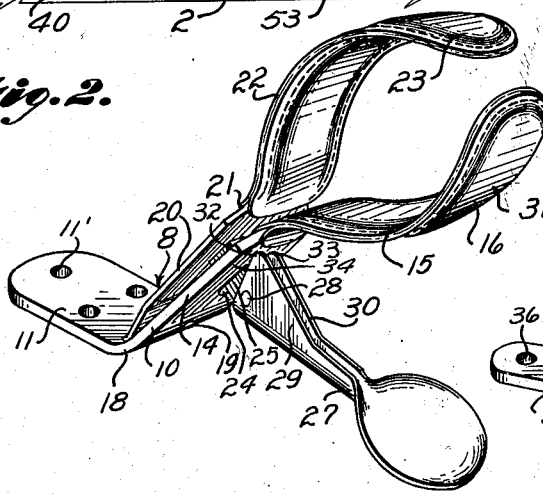
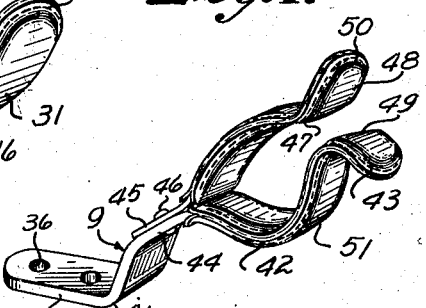
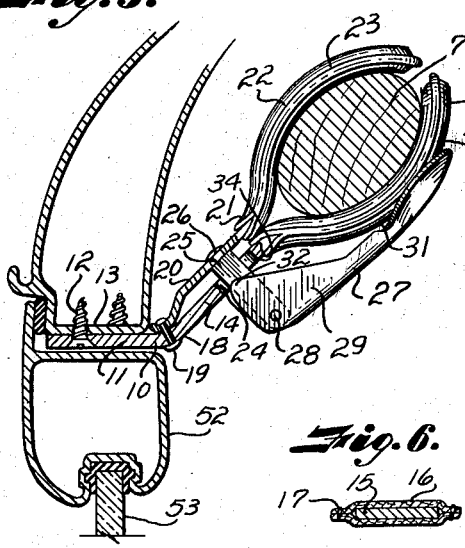
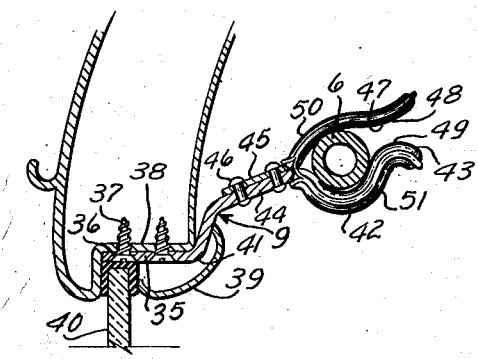
Inventor
*Arthur Reed Wilson*
By *Fishburn & Mullendore*
Attorneys Patented Mar. 24, 1953

2,632,619

UNITED STATES PATENT OFFICE 2,632,619

GUN CARRIER

Arthur Reed Wilson, Kansas City, Mo.

Application August 12, 1949, Serial No. 109,904

1 Claim. (Cl. 248—316)

This invention relates to gun supports and is particularly adapted for holding a gun in the body or frame of a vehicle such as an automobile.

The principal objects of the present invention are to provide a gun support comprising holders for engaging the stock and barrel of the gun, the holders being secured to the underside of the top door sills of the car so that the gun will be out of the way of the occupants of the car but still be readily accessible should it be necessary to use the gun; to provide for mounting of the gun along the inner side of the car just under the top and over the occupant's head; to provide a support for the gun which will releasably hold the gun in position where it can be readily taken down by the driver of the vehicle or other occupants of the vehicle with a minimum of effort; to provide supports secured to the vehicle so that the gun will remain in a fixed position out of the way of the driver or passengers in the vehicle and which will provide a secure mounting for the gun so as to not become loosened by vibration of the vehicle; to provide means for locking of the support which engages the stock of the gun, and to provide a device of this character, simple, economical to manufacture, and efficient in operation.

In accomplishing these and other objects of the invention, I have provided improved details of structure, the preferred forms of which are illustrated in the accompanying drawings, wherein:

Fig. 1 is a perspective view of my gun support showing the gun in position in the vehicle.

Fig. 2 is a perspective view of the holder which engages the stock of the gun.

Fig. 3 is a side view of the holder shown in Fig. 2, showing its attachment to the top of the door sill of a vehicle.

Fig. 4 is a perspective view of the holder for engaging the barrel of the gun.

Fig. 5 is a side view of the holder shown in Fig. 4 showing it attached to the top sill of the door or window of the vehicle.

Fig. 6 is a cross sectional view through one of the jaw members of the holders.

Referring more in detail to the drawings:

1 designates a gun shown in position in an automobile 2, having a door 3 and a rear window 4. It will be understood that the support may be secured in a two-door automobile as well as the one-door automobile as the window 4 may very well be the rear door of the car. The gun consists of a butt 5 and barrel 6, the butt having a portion designated as a stock as indicated at 7.

The stock support consists of a bracket 8 and the barrel support consists of a bracket 9, which are adapted to conveniently support and hold the gun 1 in a position out of the way of the driver or passenger of the vehicle and where it may be readily removed for use. The stock support 8 comprises a body plate 10, preferably made of a cast metal and of substantially rigid construction. It has a base 11 provided with openings 11' adapted to receive screws or the like 12 for securing the bracket to the top sill 13 of the front door 3 of the vehicle as best illustrated in Fig. 3.

The base 11 of the bracket is turned upwardly forming an arm 14 and thence laterally and upwardly forming a curved stick engaging portion or jaw 15, preferably covered with a resilient material 16 such as leather or the like to prevent marring of the stock. The cushioning material is made in two pieces and secured to the arm by stitching as indicated at 17.

Loosely secured at substantially the curved portion 18 of the bracket 8 by a rivet or the like 19 is an arm 20 preferably made of spring steel or the like which extends parallel with the arm 14 of the bracket and is turned outwardly as indicated at 21 and inwardly toward the outer end, forming a curved support or jaw 22 engaging the side of the stock opposite the portion 15. The curved portion 22 is also covered with a resilient material such as leather or the like, as indicated at 23.

The arm 14 is provided with an opening 24 through which is extended a post or standard 25 having a lug 26 on one end engaging in an opening in the bracket arm 20, the lug being bradded to rigidly secure the standard or post 25 to the spring arm 20. The opposite end of the post 25 is provided with a lever 27 pivotally secured to the post by a rivet or the like 28. The lever is formed of a U-shaped channel member having sides 29 and 30 and having its end open to engage over the standard or post 25. The outer end of the lever is enlarged and rounded to engage against the face 31 of the stock-engaging member 15. The end of the lever secured to the post is elongated forming cam members 32 and 33 for engaging against the face 34 of the bracket arm 14 as best illustrated in Fig. 2, thus providing a lock for the respective arms of the stock-supporting member 8. When the lever is in the position shown in Fig. 3, the two arms are locked together but when the lever is loosened as shown in Fig. 2, the spring steel member will be loosened from the stock so that the stock may be removed from the holder.

The barrel support or bracket 9 comprises a base 35 having openings 36 to accommodate screws 37 to secure the bracket to the top sill 38 of the window or door opening 4. It may be necessary to loosen the facing 39 to insert the bracket thereunder so as to secure it to the top sill 38 above the glass 40 of the window or door. The bracket is turned upwardly as indicated at 41 and outwardly and downwardly forming a barrel engaging member or jaw 42 and then upwardly and downwardly forming a lip 43. Secured to the portion 44 of the bracket is a spring steel plate member 45 by rivets or the like 46. The plate member extends outwardly forming one portion of the jaw member for the barrel and the outer end being turned outwardly as indicated at 47 so that the jaws will be resilient and the portions 48 and 49 forming cam surfaces so that pressure of the barrel thereagainst will cause the barrel to be inserted between the jaws.

The jaws are covered with a resilient material such as leather or the like, as indicated at 50 and 51, so as to avoid marring of the gun barrel.

The lip 43 is slightly longer and turned downwardly more prominently to provide for grasping with the fingers of the hand to facilitate removal of the barrel from the gripping jaws.

With the holders 8 and 9 constructed as described with the holder 8 inserted under the top sill of the front door 52 above the glass 53 and the rear holder inserted above the rear window opening or if a door the insertion would be the same as the front piece, the gun will be held rigidly in place.

With the holders 8 and 9 in position when the gun is desired to be positioned in the holders, the lever 27 will be moved into unlocking position as shown in Fig. 2. The stock of the barrel is then inserted between the jaws of the holder and the lever pushed to locking position as shown in Fig. 3. The gun barrel is then placed against the cam surfaces 48 and 49 of the holder 9 and pressure applied thereagainst will cause the barrel to enter between the jaws of the holder, thus holding the gun in rigid position in the automobile.

It will be obvious from the foregoing that I have provided an improved gun holder for use in automobiles which is locked securely in place and readily removable from the holder when desired for use.

What I claim and desire to secure by Letters Patent is:

A holder for supporting the stock end of a gun over the door opening of an automobile having a bracket for supporting the barrel of the gun comprising, an arm having a base member, means for securing said base member to the automobile adjacent the door opening thereof, said arm being turned at an angle to said base member, a second arm extending parallel to the first named arm, said arms having oppositely facing jaws for engaging the stock of the gun, means on the first named arm at substantially the juncture of the base member and said arm for loosely securing the second named arm to the first named arm whereby the second named arm will have slight pivotal movement with respect to the first named arm, said first named arm having an opening substantially midway between the base member and jaw, a post rigidly secured to the second named arm in alignment with the opening in the first named arm and extending therethrough, and a lever pivotally secured to the outer end of said post, said lever being of channel shape having sides engaging over the post and having enlarged portions on the inner end of the lever forming a cam surface for engaging the side of said first named arm for locking the arms together to retain the stock of the gun between said jaws.

ARTHUR REED WILSON.

REFERENCES CITED

The following references are of record in the file of this patent:

UNITED STATES PATENTS

| Number | Name | Date |
|---|---|---|
| 713,888 | Kellner | Nov. 18, 1902 |
| 795,782 | Porter | July 25, 1905 |
| 1,413,530 | Harned | Apr. 18, 1922 |
| 1,429,776 | Robinson | Sept. 19, 1922 |
| 1,691,155 | Howell | Nov. 13, 1928 |

FOREIGN PATENTS

| Number | Country | Date |
|---|---|---|
| 497,693 | Great Britain | Dec. 23, 1938 |